2,709,137

PROCESS FOR RETARDING THE DEVELOPMENT OF OXIDIZED FLAVOR IN MILK AND PRODUCT

Ernest H. Freund, Sayville, and Alexander C. Herro, Oakdale, N. Y., assignors to National Dairy Research Laboratories, Inc., Oakdale, N. Y., a corporation of Delaware No Drawing. Application July 20, 1951, Serial No. 237,826

16 Claims. (Cl. 99—54)

This invention relates to a process of inhibiting the development of oxidized flavor in fluid milk, and to fluid milk which contains a small proportion of homogenized milk and does not develop oxidized flavor after storage for long periods of time, and also to a process of inhibiting the development of oxidized flavor in fluid milk without apparent effect upon the volume of cream which forms on its surface after storage for long periods of time.

Oxidized flavor is frequently found in fluid milks having a high butter fat content or a low bacteria count. The term "oxidized" has been applied to it because oxygen dissolved in the milk is thought to be associated with its development in some way. It has also been called "cappy" or "cardboard" flavor since to some it suggests the type of flavor which might be imparted to milk by soaking cardboard in it.

The intensity of oxidized flavor increases with time; usually for a period of 24 hours after the milk has been pasteurized it is hardly noticeable, but gradually the flavor becomes stronger until the milk begins to spoil due to the growth of microorganisms. In this respect, the flavor is similar to rancidity and is distinguished from the flavor caused by certain feeds, which are as strong in the milk initially as later.

The origin of oxidized flavor is unknown. It has been reported by Gondos, Lait, 14, 25 (1934), that certain feeds make milk more susceptible to development of the flavor. It is known that the flavor is usually associated with the feeding of dry feeds during the season when cows do not have access to pasture. It is also said that a high content of unsaturated fatty acids, oleinase, contamination by heavy metals which catalyze enzymic action, and a lack of reducing substances in the milk increase the tendency towards its development. Tracy and Ruha, Milk Plant Monthly, 21, No. 2, 52 (1932), assert that oxidized flavor is the result of oxidation of unsaturated fatty acids, and that this oxidation is catalyzed by light, air, heat, enzymes and metals, such as iron or copper. Other investigators have shown that oxidized flavor may develop in the absence of light, and that the high degree of heat, e. g. temperatures of 180° F. or above, bring about the formation of reducing substances, such as sulfhydryls, in the milk, which reducing substances tend to discourage rather than catalyze the formation of oxidized flavor.

It is of course desirable to eliminate in so far as possible the development of this flavor in fluid milk prior to its consumption by the public. This entails retarding or preventing its development for a period of at least 96 hours at 40° F. following pasteurization. Various methods have been proposed to accomplish this.

In accordance with the theories expressed above, it has been found that the development of oxidized flavor in milk susceptible to this condition may be retarded by deaeration of the milk. However, this is not a practical procedure for the treatment of milk intended for human consumption, inasmuch as the protection afforded by deaeration is dependent upon the degree to which the milk is reaerated by the consumer in normal use.

Addition of antioxidants, such as ascorbic acid, has also been proposed. However, ascorbic acid is destroyed by light, and the protection is thereby cut short. Antioxidants cannot be used in most localities because the addition of antioxidants which are not normal milk constituents is illegal.

Homogenization at a temperature in excess of 110° F. is effective to retard or prevent the development of oxidized flavor. Homogenization subdivides and disperses the fat globules, and protein membrances are formed at the surface of the globules, stabilizing them and preventing their coalescence; in some way, it is thought, the effectiveness of homogenization in retarding the development of oxidized flavor is connected with this subdivision and dispersion of fat globules. However, because homogenization prevents normal agglomeration of the fat globules, the cream line is destroyed and this result is not in accord with the desire of those who prefer cream-line milk to homogenized milk.

Accordingly, it is an object of the present invention to provide a process of treating milk to prevent or retard the development of oxidized flavor.

It is a further object of the invention to retard or prevent the development of oxidized flavor in unhomogenized fluid milk without apparent effect upon the volume of cream thereof.

It is also an object of the invention to provide a fluid milk product substantially free from the development of oxidized flavor over a period of at least 96 hours at 40° F.

An additional object of the invention is to provide a fluid milk product which contains a proportion of homogenized milk but which nonetheless displays a cream line and does not develop oxidized flavor within the time usually required to bring the pasteurized product to the consumer.

In accordance with the invention, these objects are accomplished by mixing the unhomogelnized milk with homogenized milk in an amount of at least 5% by weight of the unhomogenized milk. If it is important to avoid raising the cream line of the unhomogenized milk, the homogenized milk is mixed with either cold raw unhomogenized milk, or hot pasteurized unhomogenized milk. The temperature of the unhomogenized milk during mixing has no effect on the development of oxidized flavor, but only upon its cream volume, and therefore is not critical if raising of its cream-line is unimportant.

With respect to inhibition of the development of oxidized flavor, there is no upper limit of homogenized milk which can be employed, but the larger the amount of homogenized milk, the greater the likelihood of raising the cream line. The upper limit of homogenized milk consistent with preservation of the cream line of the unhomogenized milk at its normal level is 45% by weight of the unhomogenized milk. In larger amounts the cream volume of the unhomogenized milk is reduced and the cream line is raised, but cream remains until the product is substantially entirely homogenized milk. However, there is no reason to use more homogenized milk than is needed to inhibit development of oxidized flavor. As little as 17.5% homogenized milk will retard or prevent the development of oxidized flavor, even in highly susceptible milks, and ordinarily from 10 to 17.5% homogenized milk is sufficient; an amount within this range is therefore preferred. Where the milk is only slightly susceptible to the development of this flavor, as little as 5% homogenized milk can be employed.

Homogenization, as those skilled in the art are aware, consists essentially of forcing milk or cream through a small aperture under high pressure. The degree of homogenization obtainable with a given homogenizer is measured by the rate at which fat globules rise in the milk, and is affected by the temperature of the milk, the pressure applied to the milk as it flows through the aperture, and the condition of the aperture surfaces. Application of a given pressure and temperature to the homogenization of milk in different homogenizers does not necessarily insure equal degrees of homogenization. For this reason exact conditions of temperature and pressure cannot be specified. However, homogenization normally is conducted at 110° F. or above.

For the purposes of the present invention, the term "homogenization" is therefore defined to mean that stage of homogeneity at which the per cent butterfat in the topmost 100 ml. portion taken from a quart of milk which has been homogenized, pasteurized and held undisturbed in a container for a period of 24 hours at a temperature of 40° F., shall not vary by more than 10% from the per cent butter-fat in the milk remaining in the container after the topmost 100 ml. portion has been removed.

Homogenized milk meeting the terms of this definition, although not itself possessing a cream line, does not when mixed with unhomogenized milk in the proportions and under the temperature conditions stated appreciably raise the cream line thereof. Surprisingly, although the cream line is not affected, the development of oxidized flavor in the raw or pasteurized unhomogenized milk is substantially eliminated even after storage for at least 96 hours at 40° F. after pasteurizing. Therefore, in effect, the resulting product, containing at least 5% homogenized milk, does not develop oxidized flavor before the milk spoils.

The temperature of the unhomogenized milk at the time it is mixed with the homogenized milk is not important with respect to inhibiting oxidized flavor, but it is quite important in maintaining the cream volume of the unhomogenized milk in the resulting mixture. Further, a distinction is to be made in the temperature of the unhomogenized milk when the homogenized milk is mixed with raw unhomogenized milk, and when it is mixed with pasteurized unhomogenized milk, if the cream line of the unhomogenized milk is not to be raised.

When raw unhomogenized milk is treated, it should be at a temperature below 60° F. but of course above its freezing point, and preferably in the range from 31 to 40° F., at the time it is mixed with the homogenized milk. If the raw milk is at a temperature substantially above 60° F., the cream line of the unhomogenized milk may be raised. The adjective "cold" as applied to raw unhomogenized milk in the specification and claims will be understood to refer to a temperature within the range from 31° F. to 60° F.

When pasteurized unhomogenized milk is employed, it should be at a temperature in excess of approximately 110° F. but not above about 165° F., and preferably at a pasteurization temperature, i. e., not less than about 143° F. nor above 165° F. For this reason, when pasteurized milk is employed, it will usually be found most convenient to mix the homogenized milk therewith shortly after pasteurization and before the milk has had an opportunity to cool. If pasteurized milk whose temperature is 60° F. or less is employed, the cream line thereof will be substantially raised. The adjective "hot" as applied to pasteurized unhomogenized milk in the specification and claims will be understood to refer to a temperature within the range from 110° F. to 165° F.

When the unhomogenized milk is at temperatures outside of the ranges given when mixed with the homogenized milk in proper amounts, it will be understood that although the cream line may be raised, usually it will not be destroyed, and that the homogenized milk will prevent or inhibit development of oxidized flavor as set forth.

When pasteurized unhomogenized milk is mixed in accordance with the invention with homogenized milk, it will be found convenient to pasteurize the homogenized milk before addition thereof to the unhomogenized milk. The pasteurized homogenized milk may be added without cooling to the hot pasteurized unhomogenized milk, if desired. On the other hand, when raw unhomogenized milk is employed, pasteurization is best carried out on the mixture, thus avoiding a separate pasteurization of the homogenized milk.

Pasteurization may be carried out by a holding process, i. e., at a temperature within the range of 143 to 148° F. for 30 minutes, or by a flash process, i. e., at a temperature of 160 to 165° F. for from 15 to 17 seconds. The use of higher temperatures in batch pasteurization, or of either higher temperatures or longer holding periods in high-temperature short-time pasteurization, usually results in a pronounced reduction in the volume of cream which forms on the top of the bottle.

When pasteurized-homogenized and pasteurized-unhomogenized milks are mixed, it is preferable to cool the mixture as soon as possible after mixing to a temperature in the range of 31–40° F. in order to avoid a reduction in the volume of cream.

It is not essential to pasteurize a mixture of raw homogenized and unhomogenized milk, although it is not advisable to store such a mixture for any length of time without pasteurization. Rancidity in an unpasteurized mixture can be prevented by heating the raw homogenized milk, either before or immediately after homogenization, to a temperature sufficient to substantially inactivate the lipase normally present in milk. Such a raw mixture should also be stored at a temperature low enough to prevent the development of an undesirable degree of acidity due to the growth of microorganisms.

The following examples illustrate the invention.

*Example 1*

Raw milk was heated to 145° F. and homogenized at a pressure of 2000 p. s. i. The homogenized milk was then pasteurized by heating at 145° F. for 30 minutes and cooled to 40° F. A second lot of raw milk was pasteurized by heating to 145° F. and holding it at that temperature for 30 minutes. Before the pasteurized unhomogenized milk had an opportunity to cool, 1700 parts of it was mixed with 300 parts of the pasteurized homogenized milk, and the mixture cooled to 40° F. and bottled. At the same time, 2000 parts of the pasteurized unhomogenized milk not containing homogenized milk was also bottled.

After storage for five days at 40° F. the bottles were examined; no difference in cream line was noticeable between them. The bottles were shaken and the milk tasted. The mixture containing 17.5% homogenized milk had no oxidized flavor, while the milk which had no added homogenized milk had a definite oxidized flavor.

*Example 2*

Example 1 was repeated, but in this case the pasteurized unhomogenized milk was cooled to 35° F. and then mixed with the homogenized milk.

After storage for 5 days at 40° F., the volume of the cream in the bottle of the mixture containing homogenized milk was observed to be 2½ % less than the volume of the cream in the bottle of 100% unhomogenized milk. This shows that the temperature of the pasteurized homogenized milk was too low, at the time that the pasteurized homogenized milk was mixed with it, to preserve the position of the cream line.

Both bottles were then shaken and the milk tasted. The mixture containing 17.6% of homogenized milk had no oxidized flavor, while the milk which had no added homogenized milk had a definite oxidized flavor. This shows that the addition of homogenized milk to unhomogenized milk will retard the development of oxidized flavor.

Example 3

Raw milk was heated to 145° F. and homogenized at a pressure of 2500 p. s. i. Six hundred parts of this milk before it had cooled was then added to 1800 parts of raw milk whose temperature was 50° F. The homogenized milk was then cooled to 40° F. and 600 parts of the cooled homogenized milk was added to 1800 parts of raw milk whose temperature was 50° F. Each of the mixtures was then pasteurized by heating at 145° F. for 30 minutes and then cooled to 40° F. The mixtures were then bottled, as was also an equal volume of pasteurized unhomogenized milk, and the bottles allowed to stand for four days at 40° F. At the end of this time the cream lines of all three samples were substantially at the same level. The samples were then shaken and tasted. The two mixtures containing 33⅓% homogenized milk had no noticeable oxidized flavor, whereas the 100% pasteurized unhomogenized milk had a definite oxidized flavor.

Example 4

Example 3 was repeated, but in each case the 1800 parts of raw milk was heated to the pasteurization temperature of 145° F. before addition of the homogenized milk. Each of the mixtures was then pasteurized, cooled, bottled and stored at 40° F., as before, along with a sample of the pasteurized unhomogenized milk. At the end of four days the samples were examined.

The volume of cream in each of the mixtures containing 33⅓% homogenized milk was 16% of the total volume, whereas the volume of cream in the bottle containing 100% pasteurized unhomogenized milk was 19% of the total volume. This shows that the temperature of the raw unhomogenized milk was too high at the time it was mixed with the raw homogenized milk to preserve the cream line.

Both bottles were then shaken and the milk tasted. The mixture containing 33⅓% of homogenized milk had no oxidized flavor, while the milk which had no added homogenized milk had a definite oxidized flavor. This shows that the addition of homogenized milk to unhomogenized milk will retard the development of oxidized flavor.

Example 5

Raw milk was heated to 145° F., homogenized at a pressure of 3500 p. s. i. and mixed with raw unhomogenized milk whose temperature was 40° F. in the ratio of 15 parts of homogenized milk to 85 parts of unhomogenized milk. The mixture was then pasteurized by heating to 161° F. and holding at that temperature for 16 seconds, after which the mixture was cooled to 45° F. A second batch of raw unhomogenized milk of the same volume was pasteurized under the same conditions. Samples of each batch were bottled and held at 40° F. for four days, after which the bottles were examined. The volume of cream in each bottle was the same. The bottles were then shaken and the milk tasted. The milk containing 17.6% homogenized milk had no detectable oxidized flavor, while the milk to which no homogenized milk was added had a pronounced oxidized flavor.

Example 6

Example 5 was repeated, except that prior to mixing the unhomogenized milk was heated to 161° F., the pasteurization temperature, and then mixed immediately with the homogenized milk.

After storage for 4 days at 40° F., the volume of cream in the milk mixture containing 17.6% homogenized milk was 2½% less than that of the 100% unhomogenized milk. This shows that the temperature of the unhomogenized milk was too high at the time of mixing to prevent a reduction in the volume of the cream.

Both bottles were then shaken and the milk tasted. The mixture containing 17.6% of homogenized milk had no oxidized flavor, while the milk which had no added homogenized milk had a definite oxidized flavor. This shows that the addition of homogenized milk to unhomogenized milk will retard the development of oxidized flavor.

Example 7

Raw whole milk was heated to 145° F. and homogenized at a pressure of 2000 p. s. i. The homogenized milk was then pasteurized at 145° F. for 30 minutes. Another lot of raw milk was heated to 145° F. and held at that temperature for 30 minutes to pasteurize it. Three hundred parts of the homogenized pasteurized product and 1700 parts of the unhomogenized pasteurized product were then mixed at the pasteurization temperature (145° F.) and the mixture cooled and bottled. At the same time some of the 100% unhomogenized pasteurized milk was also cooled and bottled.

After storage for five days at 38° F. the bottles were examined. The cream lines on each bottle were at the same level. The bottles were then shaken and the milk tasted. The mixture containing 17.6% homogenized milk had no detectable oxidized flavor, while the milk to which no homogenized milk had been added had a definite oxidized flavor.

Example 8

Example 7 was repeated, but prior to mixing with the pasteurized homogenized milk the pasteurized unhomogenized milk was cooled to 50° F.

After storage for five days at 38° F. the bottle was examined and compared with the bottle containing 100% unhomogenized milk. The cream line on the bottle containing 17.6% homogenized milk was higher than that with the unhomogenized milk. This shows that the temperature of the pasteurized unhomogenized milk was too low during mixing to permit preservation of the cream line.

Both bottles were then shaken and the milk tasted. The mixture containing 17.6% of homogenized milk had no oxidized flavor, while the milk which had no added homogenized milk had a definite oxidized flavor. This shows that the addition of homogenized milk to unhomogenized milk will retard the development of oxidized flavor.

The fluid milk product of the invention is useful in the same way as ordinary 100% unhomogenized milk, and is particularly desirable in place of prior milk products because of its failure to develop oxidized flavor when it is necessary to store the milk for any period. The product of the invention may be employed not only in manufacturing a bottled fluid milk for human consumption, with added ingredients such as vitamin D, if desired, but also in the manufacture of cheeses, ice cream, and butter.

Those skilled in the art will perceive various changes and modifications which may be made in the process of the invention and it will be understood that the invention is not to be limited in scope, except as set forth in the appended claims.

Whenever the term "milk" appears in the specification and claims, it will be understood that fluid cows' milk is intended.

Parts and percentages herein are by weight. Unless otherwise indicated, parts and percentages of homogenized milk are by weight of the unhomogenized milk.

The term "homogenized milk" as used in the claims refers to a milk in which, after it has been homogenized, pasteurized and held undisturbed in a quart container for a period of 24 hours at a temperature of 40° F., the percent of butter fat in the topmost 100 ml. portion taken from the container does not vary by more than 10% from the percent butter fat in the milk remaining in the container after the topmost 100 ml. portion has been removed.

We Claim:

1. A process of inhibiting the development of oxidized flavor in unhomogenized milk susceptible to the development of oxidized flavor without apparent effect upon the cream line thereof which comprises mixing a member selected from the group consisting of cold raw unhomogenized milk at a temperature below 60° F. and hot pasteurized unhomogenized milk at a temperature between about 110° F. and about 165° F. with homogenized whole milk in a minor amount of at least 5% by weight of the unhomogenized milk but less than will raise the cream line thereof, thereby obtaining a product resistant to the development of oxidized flavor in which the cream line is essentially unchanged compared to the original unhomogenized milk.

2. A fluid milk product characterized by being substantially free from the development of oxidized flavor after storage for at least 96 hours at 40° F. and by having substantially the same cream line of the original unhomogenized milk, and prepared in accordance with the process of claim 1.

3. A process of inhibiting the development of oxidized flavor in unhomogenized milk susceptible to the development of oxidized flavor without apparent effect upon the cream line thereof which comprises mixing a member selected from the group consisting of cold raw unhomogenized milk at a temperature below 60° F. and hot pasteurized unhomogenized milk at a temperature between about 110° F. and about 165° F. with homogenized whole milk in an amount within the range from about 10 to about 17.5% by weight of the unhomogenized milk but less than will raise the cream line thereof, thereby obtaining a product resistant to the development of oxidized flavor in which the cream line is essentially unchanged compared to the original unhomogenized milk.

4. A process of inhibiting the development of oxidized flavor in unhomogenized milk susceptible to the development of oxidized flavor without apparent effect upon the cream line thereof which comprises heating raw whole milk to a temperature of at least 110° F., homogenizing the whole milk, and then mixing a member selected from the group consisting of cold raw unhomogenized milk at a temperature below 60° F. and hot pasteurized unhomogenized milk at a temperature between about 110° F. and about 165° F. with the homogenized whole milk while at a homogenizing temperature in a minor amount of at least 5% by weight of the unhomogenized milk but less than will raise the cream line thereof, thereby obtaining a product resistant to the development of oxidized flavor in which the cream line is essentially unchanged compared to the original unhomogenized milk.

5. A process in accordance with claim 4 which includes heating the raw milk to a lipase inactivation temperature at the time the milk is homogenized.

6. A process in accordance with claim 4 which includes cooling the homogenized milk to a temperature not over 60° F. prior to mixing it with the unhomogenized milk.

7. A process of inhibiting the development of oxidized flavor in unhomogenized milk susceptible to the development of oxidized flavor without apparent effect upon the cream line thereof which comprises mixing a member selected from the group consisting of cold raw unhomogenized milk at a temperature below 60° F. and hot pasteurized unhomogenized milk at a temperature between about 110° F. and about 165° F. with homogenized whole milk in a minor amount of at least 5% by weight of the unhomogenized milk but less than will raise the cream line thereof, and then adjusting the temperature of the mixture to not over 40° F., thereby obtaining a product resistant to the development of oxidized flavor in which the cream line is essentially unchanged compared to the original unhomogenized milk.

8. A process of inhibiting the development of oxidized flavor in unhomogenized milk susceptible to the development of oxidized flavor without apparent effect upon the cream line thereof which comprises mixing raw unhomogenized milk at a temperature not over approximately 60° F. with homogenized whole milk in a minor amount of at least 5% by weight of the unhomogenized milk but less than will raise the cream line thereof, thereby obtaining a product resistant to the development of oxidized flavor in which the cream line is essentially unchanged compared to the original unhomogenized milk.

9. A process of inhibiting the development of oxidized flavor in unhomogenized milk susceptible to the development of oxidized flavor without apparent effect upon the cream line thereof which comprises mixing raw unhomogenized milk at a temperature not over approximately 60° F. with homogenized raw whole milk in a minor amount of at least 5% by weight of the unhomogenized milk but less than will raise the cream line thereof, pasteurizing the mixture at a temperature not less than 143° F. and then cooling the pasteurized mixture to a temperature not over approximately 40° F., thereby obtaining a product resistant to the development of oxidized flavor in which the cream line is essentially unchanged compared to the original unhomogenized milk.

10. A process of inhibiting the development of oxidized flavor in unhomogenized milk susceptible to the development of oxidized flavor without apparent effect upon the cream line thereof which comprises mixing pasteurized unhomogenized milk at a temperature above about 140° F. with homogenized whole milk in a minor amount of at least 5% by weight of the unhomogenized milk but less than will raise the cream line thereof, and then cooling the mixture to a temperature not over about 40° F., thereby obtaining a product resistant to the development of oxidized flavor in which the cream line is essentially unchanged compared to the original unhomogenized milk.

11. A process of inhibiting the development of oxidized flavor in unhomogenized milk susceptible to the development of oxidized flavor without apparent effect upon the cream line thereof which comprises mixing pasteurized unhomogenized milk at a temperature above about 140° F. with pasteurized homogenized whole milk in a minor amount of at least 5% by weight of the unhomogenized milk but less than will raise the cream line thereof, and then cooling the mixture to a temperature not over about 40° F., thereby obtaining a product resistant to the development of oxidized flavor in which the cream line is essentially unchanged compared to the original unhomogenized milk.

12. A process of inhibiting the development of oxidized flavor in unhomogenized milk susceptible to the development of oxidized flavor without apparent effect upon the cream line thereof which comprises heating raw whole milk to a homogenizing temperature, homogenizing the whole milk, pasteurizing the whole milk at a temperature in excess of approximately 140° F., mixing pasteurized unhomogenized milk at a temperature above about 140° F. with the pasteurized homogenized whole milk while still at the pasteurization temperature in a minor amount of at least 5% by weight of the unhomogenized milk but less than will raise the cream line thereof, and then cooling the mixture to a temperature not over about 40° F., thereby obtaining a product resistant to the development of oxidized flavor in which the cream line is essentially unchanged compared to the original unhomogenized milk.

13. A process in accordance with claim 12 which includes cooling the pasteurized homogenized milk to a temperature not above about 60° F. prior to mixing with the unhomogenized milk.

14. A process of inhibiting the development of oxidized flavor in unhomogenized milk susceptible to the development of oxidized flavor while retaining a cream line which comprises mixing the unhomogenized milk with homogenized whole milk in an amount of at least 5% by weight of the unhomogenized milk but less than will obliterate the cream line in the unhomogenized milk, thereby obtaining a product resistant to the development of oxidized flavor and having an appreciable cream line.

15. A fluid milk product characterized by being substantially free from the development of oxidized flavor after storage for at least 96 hours at 40° F. and by having an appreciable cream line, and prepared in accordance with the process of claim 14.

16. A process of inhibiting the development of oxidized flavor in unhomogenized milk susceptible to the development of oxidized flavor while retaining a cream line which comprises mixing the unhomogenized milk with homogenized whole milk in an amount within the range from about 10 to about 17.5% by weight of the unhomogenized milk but less than will obliterate the cream line in the unhomogenized milk, thereby obtaining a product resistant to the development of oxidized flavor and having an appreciable cream line.

References Cited in the file of this patent

UNITED STATES PATENTS

| | | |
|---|---|---|
| 1,432,686 | Grindrod | Oct. 17, 1922 |
| 2,282,800 | Musher | May 12, 1942 |

OTHER REFERENCES

Journal of Dairy Science, April 1942, pages 302–311.